United States Patent [19]

Tanaka et al.

[11] Patent Number: 4,539,592
[45] Date of Patent: Sep. 3, 1985

[54] DOUBLE-SCANNING NON-INTERLACE TELEVISION RECEIVER

[75] Inventors: Yutaka Tanaka, Yokohama; Yasunari Ikeda, Funabashi; Hiroshi Nakano, Tokyo, all of Japan

[73] Assignee: Sony Corporation, Tokyo, Japan

[21] Appl. No.: 526,064

[22] Filed: Aug. 24, 1983

[30] Foreign Application Priority Data

Aug. 25, 1982 [JP] Japan ................................. 57-147225

[51] Int. Cl.$^3$ ............................................... H04N 5/02
[52] U.S. Cl. ........................................ 358/140; 358/11; 358/152
[58] Field of Search .................. 358/140, 11, 137, 288, 358/152

[56] References Cited

U.S. PATENT DOCUMENTS 3,970,776  7/1976  Kinuhata ............................. 358/140
4,057,835  11/1977 Kinuhata ............................. 358/140
4,251,835  2/1981  Eriksen ............................... 358/152

Primary Examiner—Howard W. Britton
Attorney, Agent, or Firm—Lewis H. Eslinger; Alvin Sinderbrand

[57] ABSTRACT

A television receiver having a signal input terminal supplied with an interlace video signal and a signal coverter connected to the input terminal for converting the interlace video signal to a non-interlace signal to be displayed. The signal converter includes a signal inserting circuit for inserting new line signals between two successive line signals of the interlace signal, the new line signals being formed by interpolating one of the preceding and succeeding line signals in the interlace signal. A three dimensional filter is connected to the signal converter for attentuating vertical and horizontal high frequency components in the non-interlace video signal only when the non-interlace signal includes both of the vertical and horizontal high frequency components.

11 Claims, 13 Drawing Figures

DOUBLE-SCANNING NON-INTERLACE TELEVISION RECEIVER

BACKGROUND OF THE INVENTION

1. Field of the Invention

The present invention relates generally to television receivers and more particularly is directed to a double-scanning non-interlace television receiver which receives a video signal of an interlace scanning system and displays it with a non-interlace scanning system.

2. Description of the Prior Art

Generally, in the picture display of an interlace scanning system, when one frame contains 525 scanning lines, 262.5 scanning lines constitute one field in which when the vertical frequency is selected as 60 Hz, a field flicker can be suppressed. Also, in order to obtain a picture of high vertical resolution, during the succeeding field the scanning is carried out after being displaced in spacing by one half of the scanning line.

However, in this case, although the number of picture images is given as 60 pictures/sec from a macroscopic point of view, one scanning line at the same position is lit at every 1/30 seconds and the display period is 1/30 seconds from a microscopic point of view. As a result, the light emission of one scanning line is flickered, which then causes a so-called flicker visually. Namely, a line flicker occurs.

In order to reduce the line flicker, it is enough that the display period of one scanning line is selected to be shorter than 1/30 seconds. Therefore, in the art a double-scanning television receiver has been proposed in which the double-speed scanning with the horizontal frequency doubled is performed. In this case, the display periods of both the field and line are selected to be 1/60 seconds so that the field flicker and the line flicker will never occur.

In order to perform the double-speed scanning in which the horizontal frequency is doubled, the video signal of an interlace system is converted into the form of a video signal of an non-interlace system having the horizontal frequency which is doubled and then fed to a picture tube.

As the above converting method, in the art there have been previously proposed methods which are embodied by practical circuits shown in FIGS. 1 to 3, respectively.

First, FIG. 1 shows a method of predicting that a video signal on a preceding scanning line is the same as that on the succeeding scanning line and employing directly the video signal on the preceding scanning line as an interpolated signal, namely, a so-called pre-value interpolation method.

In FIG. 1, reference numeral 1 designates an input terminal to which a video signal $S_i$ of an interlace system is supplied. Reference numerals 2 and 3 respectively designate 1 H (one horizontal period) memories which are each so formed that the read speed is selected to be twice as high as the write speed. Reference numerals 4 and 5 respectively designate change-over switches, each of which is changed in position at each 1 H period so that when the change-over switch 4 is changed in position to one side of the 1 H memories 2 and 3, the change-over switch 5 is changed in position to the other side thereof.

In the example shown in FIG. 1, the video signal $S_i$ applied to the input terminal 1 is alternately written in the 1 H memories 2 and 3 by 1 H period amount each, and in the 1 H period during which the video signal $S_i$ is being written into one of the 1 H memories 2 and 3, the video signal $S_i$ of 1 H period amount written therein during the preceding 1 H period is continuously read out twice from the other one of the 1 H memories 2 and 3 and then delivered to an output terminal 6. Accordingly, in this case, at the output terminal 6 is obtained a video signal $S_{NI}$ (shown in FIG. 4B) of non-interlace system which has the horizontal frequency twice that of the video signal $S_i$ or in which the video signal of each scanning line of the video signal $S_i$ continuously appears twice each with every ½ H periods.

FIG. 2 shows a method of predicting that a video signal on the scanning line to be interpolated is equal to a video signal on a scanning line of a preceding field and employing this video signal as the interpolated signal, namely, a so-called pre-field interpolation method.

In FIG. 2, reference numerals 2A and 3A respectively designate 1 H memories and reference numerals 4A and 5A change-over switches which operate in the same way as the 1 H memories 2 and 3 and the change-over switches 4 and 5 shown in FIG. 1. Also, reference numerals 2B and 3B respectively designate 1 H memories and reference numerals 4B and 5B change-over switches which also operate in the same way as the 1 H memories 2 and 3 and the change-over switches 4 and 5 shown in FIG. 1.

Also in FIG. 2, reference numeral 7 designates a delay line which has a delay amount of 1 V (one field period, strictly speaking 262 H periods).

Reference numeral 8 designates a change-over switch which is changed in position at every ½ H period. Accordingly, the video signal of 1 H period amount read out from the 1 H memory 2A or 3A and the video signal of 1 H period amount read out from the 1 H memory 2B or 3B are sequentially supplied through this change-over switch 8 to an output terminal 6 at every ½ H periods.

In the example shown in FIG. 2, at the output terminal 6 appears a video signal $S_{NI}'$ (shown in FIG. 4C) of non-interlace system which has the horizontal frequency doubled and in which the video signal on each scanning line of the present field and the corresponding video signal on the scanning line of the preceding field appear alternately at every ½ H periods.

FIG. 3 shows a method of predicting that a video signal on the scanning line to be interpolated equals the arithmetic average of the video signals on the preceding and succeeding scanning lines and employing the above video signal as an interpolated signal, namely, a so-called arithmetic average-field interpolation method.

In FIG. 3, reference numerals 2c and 3c respectively designate 1 H memories and 4c and 5c change-over switches which operate in the same way as the 1 H memories 2 and 3 and the change-over switches 4 and 5 shown in FIG. 1. Accordingly, through the change-over switch 5C there is derived a video signal in which the video signal of the input video signal $S_i$ on each scanning line appears twice continuously at every ½ H periods. This video signal is supplied through a delay line 9 having a delay amount of ½ H period to an adder 10. Also, this video signal is directly supplied to the adder 10 so that the adder 10 generates the output signal resulting from adding two video signals, which is then adjusted to be the ½ level by a level adjuster 11 and then fed to the output terminal 6.

Thus, according to the example shown in FIG. 3, at the output terminal 6 appears a video signal $S_{NI}''$ (shown in FIG. 4D) of non-interlace system which has the horizontal frequency twice that of the original video signal and in which a video signal of the input video signal $S_i$ on each scanning line and a video signal resulting from arithmetically averaging two video signals, namely, this video signal and a video signal on the succeeding scanning line alternately appear at every ½ H periods.

If the video signals $S_{NI}$ to $S_{NI}''$ of a non-interlace system, each having the horizontal frequency twice that of the original video signal provided as described above, are supplied to a picture tube so as to perform the double-speed scanning, the field flicker and line flicker as described above will never occur.

However, a double scanning television receiver which employs the above video signals $S_{NI}$ to $S_{NI}''$ of a non-interlace system to perform the double speed scanning has the following defects.

In the double-scanning television receiver which employs the video signal $S_{NI}$ of a non-interlace system having the interpolated signal provided according to the pre-value interpolation method as shown in FIG. 1, the scanning line of the same video signal succeeds twice so that a line in the oblique direction becomes stairs or zig-zag. Although this stairs or zig-zag-shape line is inconspicuous in the still picture, this causes the significant deterioration of picture quality in the moving picture. This defect becomes more serious as the size of picture screen becomes larger.

In the double-scanning television receiver which employs the video signal $S_{NI}'$ of a non-interlace system having the interpolated signal provided according to the pre-field interpolation method as shown in FIG. 2, the scanning line of the video signal on the present field and the scanning line of the video signal on the preceding field are alternately displayed on the picture screen so that this television receiver is ideally suitable for the picture having a strong correlation in the direction of time, namely, the still picture. However, in the moving picture, time difference occurs within the picture and hence the picture quality is deteriorated.

Further, in the double-scanning television receiver which employs the video signal $S_{NI}''$ of a non-interlace system having the interpolated signal provided according to the pre-value average interpolation method as shown in FIG. 3, since the video signal on the scanning line interpolated equals to the arithmetic average of the video signals on the preceding and succeeding scanning lines, the integral action thereof causes the resolution in the vertical direction to be deteriorated. However, in this case, the fact that the line in, for example, the oblique direction becomes stairs is alleviated as compared with the case of the example shown in FIG. 1.

As described above, according to the pre-value interpolation method shown in FIG. 1, the line in, for example, the oblique direction becomes stairs, which then causes the picture quality to be deteriorated. On the other hand, according to the pre-value average interpolation method shown in FIG. 3, although the integral effect alleviates the deterioration of the above picture quality, this method is substantially the same as connecting a low-pass filter in the vertical direction, thus the resolution being lowered.

Consider a window pattern as, for example, shown in FIG. 5. According to the pre-value average interpolation method as shown in FIG. 3, the resolution of the sides $\overline{AB}$ and $\overline{CD}$ is deteriorated and hence a so-called "blur" occurs.

By the way, the video signal region in which the picture quality is deteriorated according to the pre-value interpolation method shown in FIG. 1 is the region or area having high frequency band components in the vertical and horizontal directions like the line in the oblique direction in FIG. 5. The area having the high frequency band components is such an area in which the brightness changes abruptly. In the window pattern shown in FIG. 5, only the corners A, B, C and D correspond to such area.

OBJECTS AND SUMMARY OF THE INVENTION

Accordingly, it is an object of the present invention to provide an improved double-scanning non-interlace television receiver capable of obviating the above defects inherent in the conventional double-scanning non-interlace television receiver.

Another object of the present invention is to provide a double-scanning non-interlace television receiver capable of preventing the picture quality from being deteriorated.

A further object of the present invention is to provide a double-scanning non-interlace television receiver capable of preventing the resolution from being lowered.

According to one aspect of the present invention, there is provided a double-scanning non-interlace television receiver comprising:

a signal input terminal supplied with an interlace video signal; and signal converter means connected to said input terminal for converting said interlace video signal to a non-interlace signal to be displayed;

characterized in that said signal converter means includes signal inserting means for inserting new line signals between two successive line signals of said interlace signal, said new line signals being formed by interpolating one of the preceding and succeeding line signals in said interlace signal, and a three dimensional filter is connected to said signal converter means for decaying both of vertical and horizontal high frequency components in said non-interlace video signal only when said non-interlace signal includes both of the vertical and horizontal high frequency components.

The other objects, features and advantages of the present invention will become apparent from the following description taken in conjunction with the accompanying drawings through which the like references designate the same elements and parts.

DESCRIPTION OF THE PREFERRED EMBODIMENTS

Figure 6:
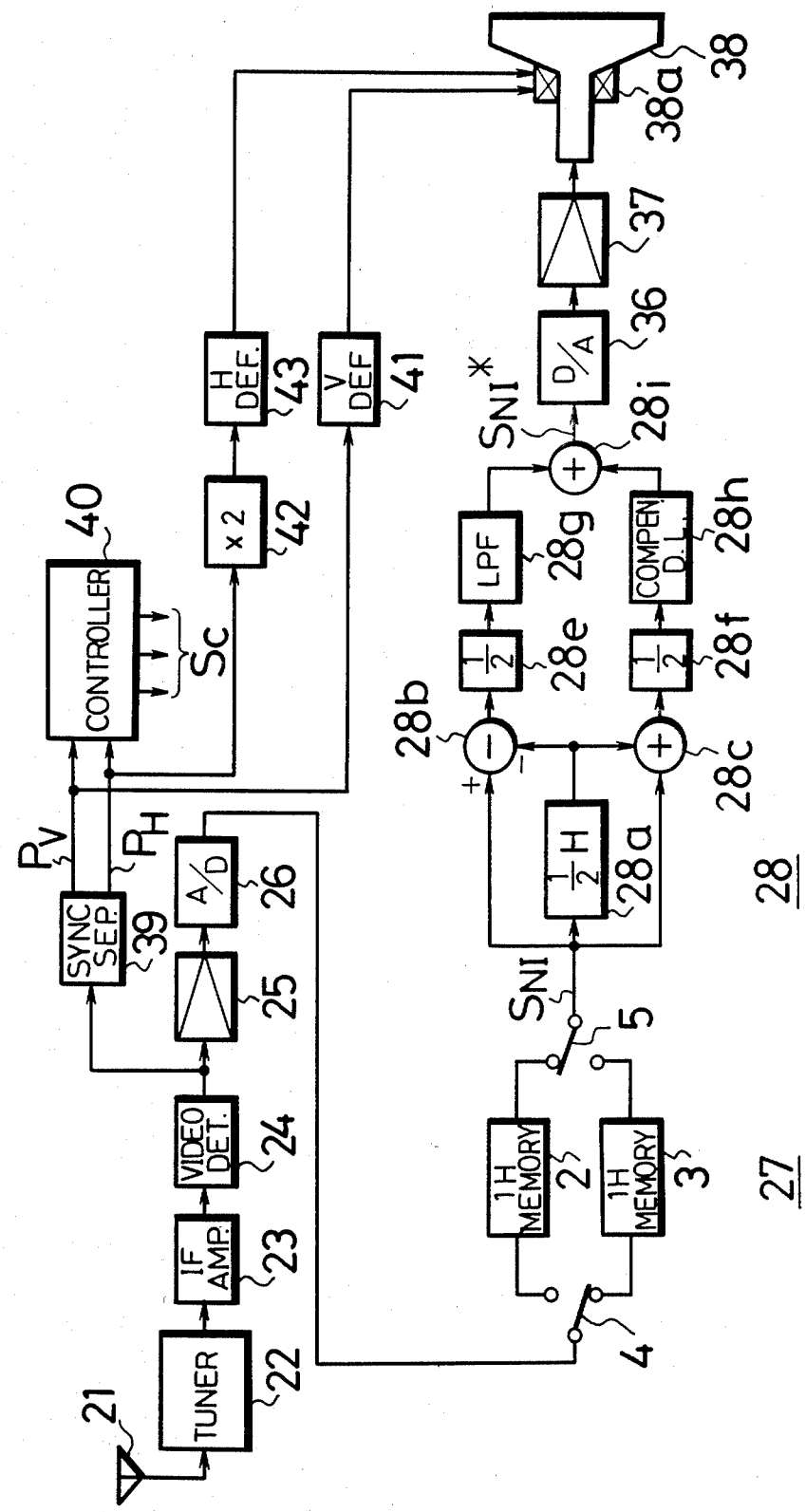
FIG. 6 is a block diagram showing an embodiment of a double-scanning non-interlace television receiver according to the present invention.

Now, the double-scanning non-interlace television receiver according to the present invention will hereinafter be described with reference to the attached drawings. In FIG. 6 which shows an example of the invention, like parts corresponding to those of FIG. 1 are marked with the same references and will not be described in detail.

Figure 4A:
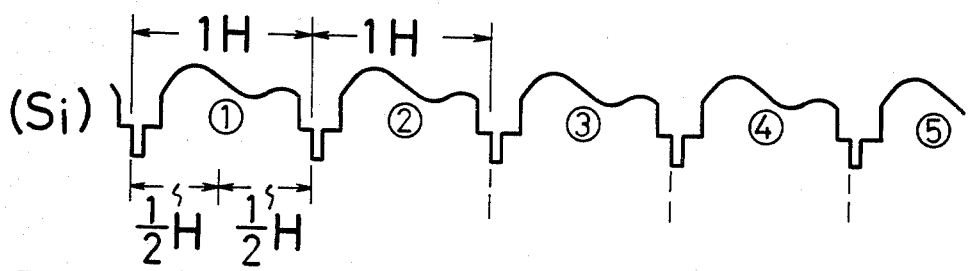
FIGS. 4A to 4D and FIG. 5 are respectively diagrams useful for the explanation thereof.

In FIG. 6, reference numeral 21 designates an antenna, 22 a tuner connected thereto, 23 a video intermediate frequency amplifier connected to the output side of the tuner 22 and 24 a video detector connected at the rear stage of the amplifier 23. The video signal derived from the video detector 24 is amplified by an amplifier 25, converted to a digital signal by an A/D (analog-to-digital) converter 26 and then fed to a scan converter circuit into higher line frequency or double-speed scanning converter 27 as a converted signal $S_i$ (shown in the form of the analog signal in FIG. 4A).

Figure 1:
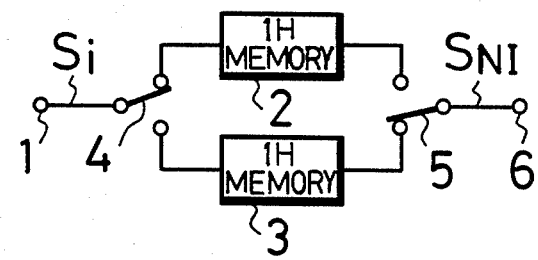
FIGS. 1 to 3 are respectively block diagrams showing examples of conventional double-speed converting circuits.
Figure 2:
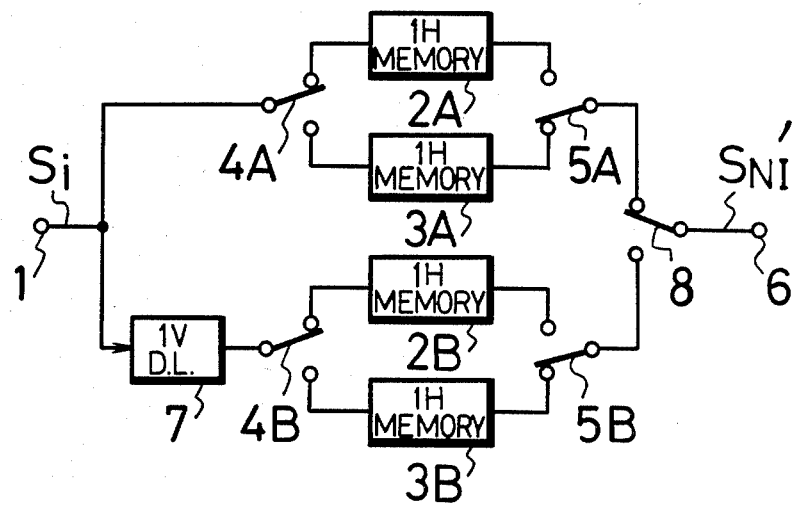
Figure 3:
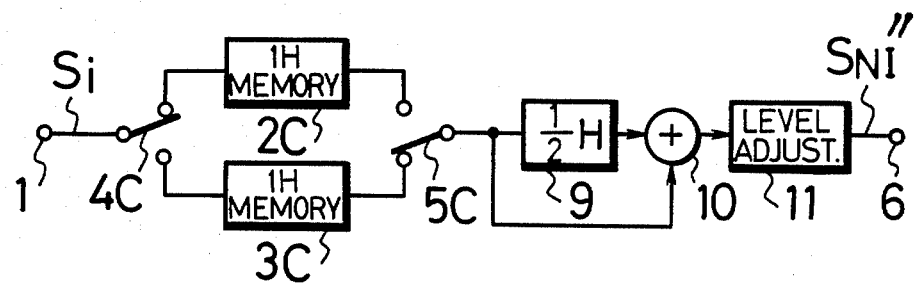
Figure 4B:
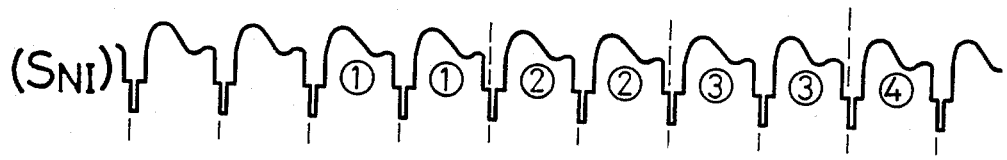
Figure 4C:
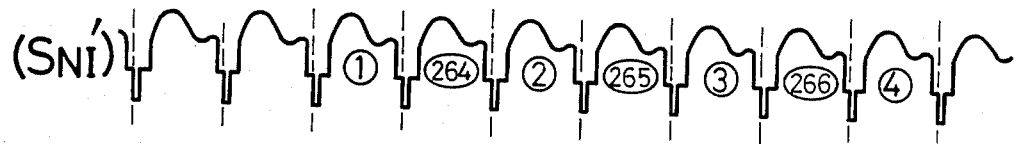
Figure 4D:
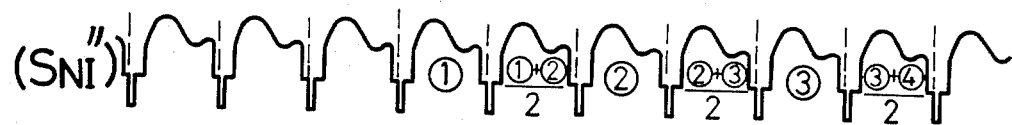

The double-speed scanning converter 27 is constructed the same as that of the example shown in FIG. 1 and provides an interpolated signal according to the pre-value interpolation method. Thus, from the change-over switch 5 there is delivered the video signal $S_{NI}$ (shown in the form of the analog signal in FIG. 4B) which has the horizontal frequency twice as high as the horizontal frequency of the video signal $S_i$ and in which the video signal of the video signal $S_i$ on each scanning line appears twice each at every ½ H periods (the second signal in the continuous signals is the interpolated signal). This video signal $S_{NI}$ is supplied to a spatial or three-dimensional filter 28 which then attenuates or decays the region of the video signal $S_{NI}$ in which the high frequency band components of the vertical and horizontal directions of the interpolated signal exist simultaneously.

The three-dimensional filter 28 consists of, for example, delay line 28a formed of, for example, one-line memory and having a delay amount of ½ H period, a subtracter 28b, an adder 28c, level adjusters 28e and 28f, each of which adjusts the level to be decreased to the half, a low-pass filter 28g, a time compensation delay line 28h and an adder 28i.

In this case, the delay line 28a and the subtracter 28b constitute a high-pass filter in the vertical direction. At the subtracter 28b, a signal resulting from supplying the video signal $S_{NI}$ through the delay line 28a is subtracted from the video signal $S_{NI}$. Then, from the subtracter 28b there is delivered such a signal which includes the region of the video signal $S_{NI}$ having the high frequency band component in the vertical direction (containing the low and high frequency band components in the horizontal direction) and which is then fed through the level adjuster 28e to the low-pass filter 28g.

The low-pass filter 28g comprises a low-pass filter in the horizontal direction so that this low-pass filter 28g provides such a signal which includes the region of the video signal $S_{NI}$ having the high frequency band component in the vertical direction and the low frequency band component in the horizontal direction and which is then fed to the adder 28i.

The delay line 28a and the adder 28c constitute a low-pass filter in the vertical direction. At the adder 28c, the video signal $S_{NI}$ and a signal resulting from passing the video signal $S_{NI}$ through the delay line 28a are added together so that the adder 28c provides such a signal which includes the region of the video signal $S_{NI}$ having the low frequency band component in the vertical direction (containing the low and high frequency band components in the horizontal direction) and which passes through the level adjuster 28f and then is compensated for in time by the time compensation delay line 28h and then fed to the adder 28i.

Thus, the adder 28i provides a video signal $S_{NI}{}^*$ whose region having the high frequency band components in the vertical and horizontal directions of the video signal $S_{NI}$ is attenuated.

By the way, since the video signal $S_{NI}$ is formed such that the video signal on the same scanning line continuously appears twice at every ½ H periods and the second signal of the continuous signals is the interpolated signal, in the video signal $S_{NI}{}^*$ derived from the three-dimensional filter 28, the region, in which the vertical and horizontal direction components of the interpolated signal exist at the same time, is attenuated.

Figure 7:
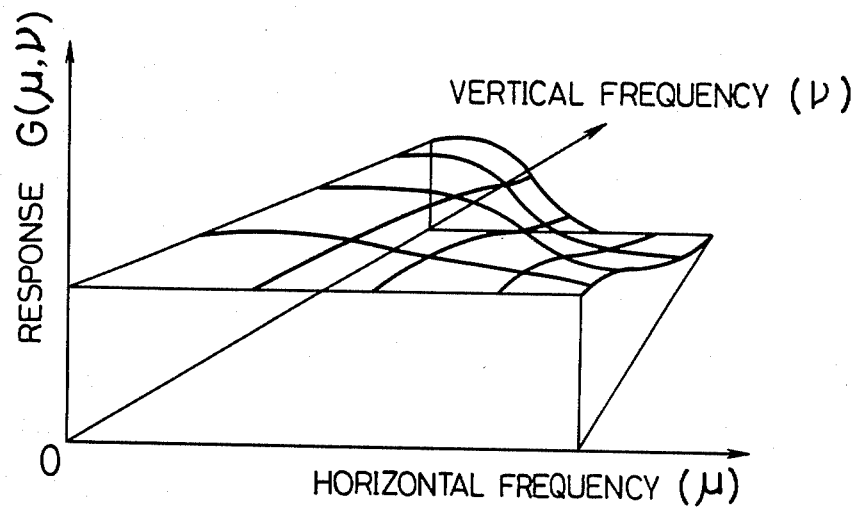
FIG. 7 is a graph indicating filter characteristics of a spatial or three-dimensional filter used in the embodiment shown in FIG. 6.

FIG. 7 shows the characteristic of this three-dimensional filter 28 in which reference letter $\nu$ represents the vertical frequency (cycle/picture height), $\mu$ the horizontal frequency (in Hz) and G $(\mu,\nu)$ the response, respectively.

Figure 8:
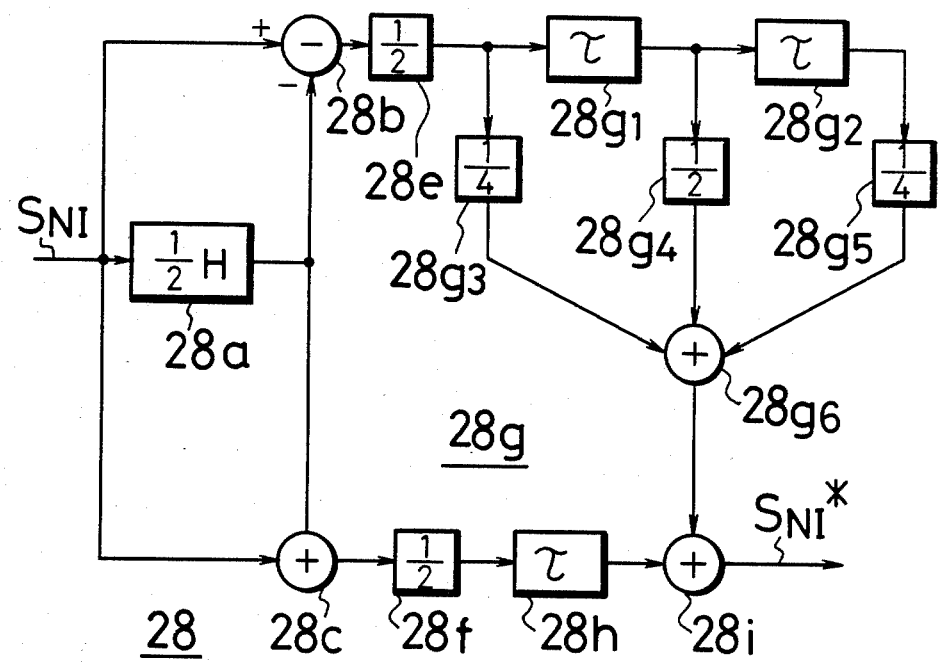
FIG. 8 is a block diagram showing a practical example of the three-dimensional filter used in the embodiment of the present invention shown in FIG. 6.

When the three-dimensional filter 28 is constructed as, for example, shown in FIG. 8, namely, the low-pass filter 28g is formed of delay lines $28_{g1}$ and $28_{g2}$, each having a delay amount $\tau$ (for example, about 70 nsec), level adjusters $28_{g3}$ and $28_{g5}$, each of which adjusts the level to be decreased to one-fourth, a level adjuster $28_{g4}$ for adjusting the level to one-half and an adder $28_{g6}$ and also the delay amount of the time compensation delay line 28h is selected to be $\tau$, the transfer function H $(\mu,\nu)$ and the amplitude characteristic $|H(\mu,\nu)|$ of the filter 28 are expressed as follows.

$$H(\mu,\nu) \qquad (1)$$

$$= \frac{1 + e^{-j2\pi\nu h}}{2} e^{-j2\pi\mu\tau} +$$

$$\frac{1 - e^{-j2\pi\nu h}}{2} \cdot \frac{1 + 2e^{-j2\pi\mu\tau} + e^{-j4\pi\mu\tau}}{4}$$

$$= e^{-j\pi\nu h} \cos(\pi\nu h) e^{-j2\pi\mu\tau} +$$

$$je^{-j\pi\nu h} \sin(\pi\nu h) e^{-j2\pi\mu\tau} \cos^2\left(\frac{2\pi\mu\tau}{2}\right)$$

$$= e^{-j2\pi\left(\frac{\nu h}{2} + \mu\tau\right)} \left[\cos(\pi\nu h) + \right.$$

$$\left. j\sin(\pi\nu h) \cos^2\left(\frac{2\pi\mu\tau}{2}\right)\right]$$

$$|H(\mu,\nu)| \qquad (2)$$

$$= \sqrt{\cos^2(\pi\nu h) + \sin^2(\pi\nu h) \cos^4(\pi\mu\tau)}$$

where μ represents the horizontal frequency, ν the vertical frequency, h the line delay time after the double-speed scanning conversion ($=\frac{1}{2}$ H) and τ the delay time in the order of 70 n sec.

Figure 9:
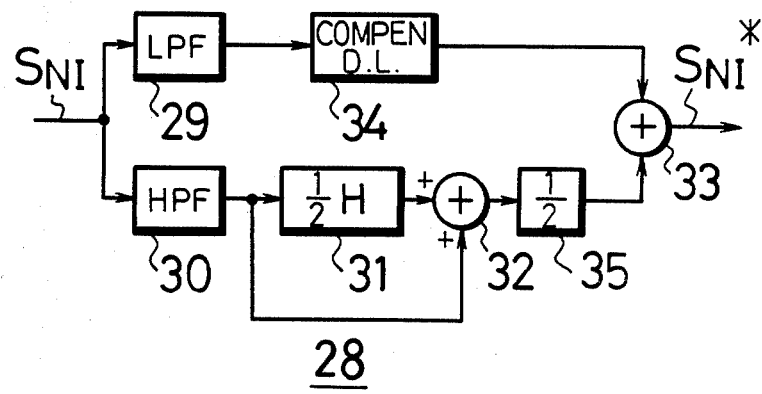
FIG. 9 is a block diagram showing another example of the three-dimensional filter used in the present invention.

The three-dimensional filter 28 can also be constructed as shown in FIG. 9.

In the figure, reference numeral 29 designates a low-pass filter, 30 a high-pass filter, 31 a delay line of ½ H, 32 and 33 adders respectively, 34 a time compensation delay line and 35 a level adjuster for adjusting the level to be reduced to one-half. In this case, the low-pass filter 29 and the high-pass filter 30 constitute low-pass and high-pass filters in the horizontal direction, while the delay line 31 and the adder 32 constitute a low-pass filter in the vertical direction. Thus, according to the example of FIG. 9, it is also possible to obtain the filter characteristic as shown in FIG. 7.

Turning back to FIG. 6, the video signal $S_{NI}^*$ derived from the three-dimensional filter 28 is converted to the analog signal by a D/A (digital-to-analog) converter 36 and then supplied through an amplifier 37 to a picture tube 38.

On the other hand, the video signal from the video detector 24 is also supplied to a synchronizing separating circuit 39 which then provides horizontal and vertical synchronizing signals $P_H$ and $P_V$. These horizontal and vertical synchronizing signals $P_H$ and $P_V$ are both supplied to a controller 40. This controller 40 generates the control signal for the change-over switches 4 and 5 in the double-speed scanning converting circuit 27 and control signals $S_C$ such as a sampling signal and so on based on the synchronizing signals $P_A$ and $P_V$.

The vertical synchronizing signal $P_V$ is also supplied to a vertical deflecting circuit 41 from which a vertical deflection signal is supplied to a deflection coil 38a of the picture tube 38. On the other hand, the horizontal synchronizing signal $P_H$ is also fed to and multiplied by "2" in a 2-multiplier 42 and then fed to a horizontal deflecting circuit 43 from which a horizontal deflection signal is supplied to the deflection coil 38a of the picture tube 38.

As a result, the non-interlace display having the scanning lines doubled by the double-speed scanning converting signal $S_{NI}^*$ is carried out on the picture tube 38.

Figure 5:
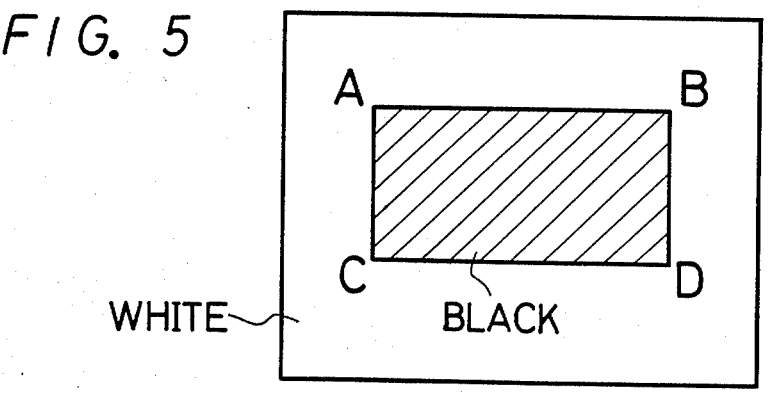

According to this embodiment, the interpolated signal is provided by the pre-value interpolation method fundamentally as described above. Since the region in which the high frequency band components of the interpolated signal in the vertical and horizontal directions exist simultaneously is decayed by the three-dimensional filter 28, it is possible to prevent the lines of, for example, oblique direction from being made stairs to cause the picture quality to be deteriorated. Also, in this case, as compared with the case according to the pre-value average interpolation method, this example does not deteriorate the resolution of the sides $\overline{AB}$ and $\overline{CD}$ in the window pattern as, for example, shown in FIG. 5.

In the example shown in FIG. 6, if the 1 H memories 2 and 3 forming the double-speed scanning converting circuit 27 are formed as analog memories, the double-speed scanning converting circuit 27 can operate in analog fashion. In this case, the A/D converter 26 and the D/A converter 36 become unnecessary.

Figure 10:
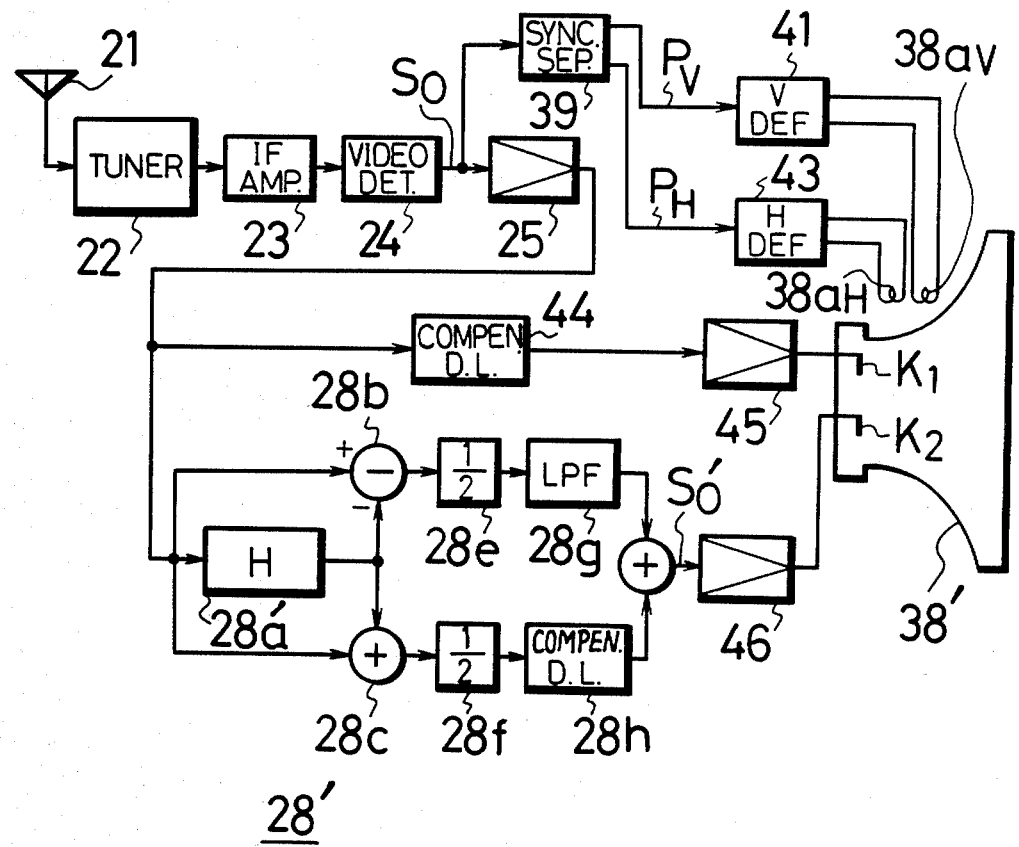
FIG. 10 is a block diagram showing another embodiment of the double-scanning non-interlace television receiver according to the present invention.

FIG. 10 shows another embodiment of the double-scanning non-interlace television receiver according to the present invention. In this embodiment, like parts corresponding to those of FIG. 6 are marked with the same references.

The illustrative embodiment of FIG. 10 shows the double-scanning non-interlace television receiver which employs a twin-beam system picture tube 38'.

In the case of the embodiment shown in FIG. 10, a first beam $B_{m1}$ concerning a first cathode $K_1$ and a second beam $B_{m2}$ concerning a second cathode $K_2$ scan the picture screen under the state that they are made adjacent to each other with a spacing one half the spacing of the interlace scanning system.

Assume that there are 525 scanning lines. Then, in the case of a single-beam system picture tube, only 262.5 scanning lines are lit within one field period. However, in the embodiment shown in FIG. 10, the remaining 262.5 scanning lines, which inherently will be lit within the next field period, are scanned by the second beam $B_{m2}$ to emit light so that all of the 525 scanning lines are lit within one field period, thus performing the non-interlace display in which the display period of each scanning line is selected to be 1/60 sec.

In the embodiment shown in FIG. 10, the original video signal is supplied to the first cathode $K_1$ concerning the first beam $B_{m1}$, while the interpolated signal is supplied to the second cathode $K_2$ concerning the second beam $B_{m2}$. This interpolated signal is fundamentally the same as the original video signal supplied to the first cathode $K_1$ and is provided according to the pre-value interpolation method. However, the region of the interpolated signal having the high frequency band components in the vertical and horizontal directions is decayed. Because, such region causes the picture quality to be deteriorated in which the lines in the oblique direction become stairs as mentioned above.

In FIG. 10, a video signal $S_0$ derived from the video detector 24 is amplified by an amplifier 25 and then fed to the first cathode $K_1$ via a time compensation delay line 44 and an amplifier 45.

The video signal $S_0$ is also supplied through the amplifier 25 to a spatial or three-dimensional filter 28'.

This three-dimensional filter 28' is constructed the same as the three-dimensional filter 28 in the example of FIG. 6 except the fact that a delay line 28a thereof is formed of, for example, one-line memory and having a delay amount of 1 H, and has the same characteristic as shown in FIG. 7.

Accordingly, this three-dimensional filter 28' provides a video signal $S_0'$ whose region having the high frequency band components of the video signal $S_0$ in the vertical and horizontal directions is decayed and which is then supplied through an amplifier 46 to the second cathode $K_2$.

In FIG. 10, the vertical synchronizing signal $P_V$ derived from the synchronizing separating circuit 39 is supplied to the vertical deflecting circuit 41 from which the vertical deflection signal is supplied to a deflection coil 38aV. Meanwhile, the horizontal synchronizing signal $P_H$ also derived from the synchronizing separating circuit 39 is supplied to the horizontal deflecting circuit 43 from which the horizontal deflection signal is supplied to a deflection coil 38aH.

Although the embodiment of FIG. 10 produces the interpolated signal fundamentally according to the pre-value interpolation method as described above, the region of the interpolated signal supplied to the second cathode $K_2$ in which the high frequency band components in the vertical and horizontal directions exist at the same time is decayed, so that the same operation and effect as those of the embodiment shown in FIG. 6 can be achieved.

While the embodiment of FIG. 10 is so formed that the signal is processed in the form of the analog signal, it may be formed such that the signal can be processed in the form of the digital signal in the same way as in the embodiment shown in FIG. 6.

When the present invention is applied to a double-scanning color television receiver, it is sufficient that the color difference signals are written twice. Because, the color difference signals are of the narrow pass band and even if they are simply written twice, the deterioration of the picture quality as aforesaid will never occur.

As will be clear from the embodiments described as above, according to the double-scanning non-interlace television receiver of the present invention, the interpolated signal is provided according, fundamentally, to the pre-value interpolation method. In this case, however, since the region of the interpolated signal in which the high frequency band components in the vertical and horizontal directions exist simultaneously is decayed, it is possible to prevent the lines in, for example, the oblique direction from being made stairs to thereby cause the picture quality to be deteriorated. In this case, as compared with the resolution according to the pre-value average interpolation method, even in the window pattern as, for example, shown in FIG. 5, the resolution of the sides $\overline{AB}$ and $\overline{CD}$ is not deteriorated.

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

We claim as our invention:

1. A television receiver supplied with an interlace video signal, comprising:
    signal converter means for converting said interlace video signal to a non-interlace signal including signal inserting means for inserting new line signals between two successive line signals of said interlace signal, said new line signals being formed by interpolating one of the preceding and succeeding line signals in said interlace signal, and
    three dimensional filter means connected to said signal converter means for attenuating both vertical and horizontal high frequency components in said non-interlace video signal only when said non-interlace signal simultaneously includes said vertical and horizontal high frequency components, and producing an output signal fed to a picture tube of said television receiver.

2. A television receiver according to claim 1, wherein said three dimensional filter comprises:
    a horizontal memory;
    a first adder for adding input and output signals of said horizontal memory and producing a sum signal therefrom;
    a subtracter for subtracting the output of said horizontal memory from the input thereof and producing a difference signal;
    level adjuster means connected to said first adder and to said subtracter for adjusting the signal level of said sum and difference signals, respectively;
    a low pass filter connected to said level adjuster means;
    a compensation delay line connected to said level adjuster means; and
    a second adder for adding the output signals from said compensation delay line and said low pass filter.

3. A television receiver according to claim 1, wherein said signal converter means comprises a scanning converter for doubling the frequency of said interlace signal and said three dimensional filter is connected to said scanning converter.

4. A television receiver according to claim 1, wherein said signal converter means comprises signal dividing means for introducing said interlace signal to first and second signal paths, said first and second signal paths being provided for a twin-beam scanning in a cathode ray tube; and said three dimensional filter is inserted in one of said first and second signal paths.

5. A television receiver according to claim 1, in which said three-dimensional filter means includes a delay line having a delay of ½ H, and receiving said non-interlace signal, a first adder for adding input and output signals of said input delay line and producing a sum signal therefrom, a subtracter for subtracting the output signal of said delay line from the input signal thereof and producing a difference signal, a plurality of level adjusters connected to the output of said first adder and said subtracter for adjusting the level of said sum and difference signals, a low-pass filter connected to a selected one of said plurality of level adjusters associated with said subtracter and formed of two serially connected delay lines, and three of said plurality of level adjusters being arranged for adjusting the difference signal level, wherein the first of said three level adjuster reduces the difference signal level by ¾ and is connected ahead of said delay lines, the second of said three level adjusters reduces the difference signal level by ½ and is connected between said delay lines, and the third of said three level adjusters reduces the difference signal level by ¾ and is connected after said delay lines, and an output of said low-pass filter output being fed to a second adder for adding the adjusted difference signals of said ¼, ½ and ¼ level adjusters, a delay line connected to the level adjuster associated with said first adder for delaying the adjusted sum signal, and a third adder for adding the filtered and adjusted difference signal from said low-pass filter to the delayed and adjusted sum signal from said input delay line for producing a filtered signal.

6. A television receiver according to claim 1, in which said three dimensional filter means includes a low-pass filter and a high-pass filter connected in parallel, said low-pass filter output being connected to a time compensation delay line, said high-pass filter output being connected to a ½ H delay line, with a first adder having one input receiving said ½ H delay line output and another input receiving the output of said high-pass filter, a level adjuster connected to said output of said first adder, and a second adder connected to the outputs of said time compensation delay line and said level adjuster for producing a filtered signal.

7. A television receiver supplied with an interlace video signal for converting said interlace video signal into a non-interlace video signal for display, comprising:
    a sync-signal separating circuit receiving said video signal and separating therefrom horizontal and vertical sync-signals;
    controller means responsive to said horizontal and vertical sync-signals for producing therefrom change-over control signals;

signal converter means receiving said interlace video signal for conversion into a non-interlace video signal under the control of said change-over control signals;

a three-dimensional filter receiving said non-interlace video signal for filtering out vertical and horizontal high-frequencies occurring simultaneously in said non-interlace video signal; and television display means receiving said filtered non-interlace video signal and including a scan deflection circuit responsive to said separated horizontal and vertical sync-signals for displaying said filtered non-interlace video signal under control of said deflection circuit.

8. A television receiver according to claim 7, in which said signal converter means includes first and second memories each having a one horizontal scan period capacity and having inputs connected respectively to fixed terminals of a write switch and outputs connected respectively to fixed terminals of a read switch, said write switch and said read switch being alternately actuated in response to said change-over control signals, whereby when said first memory is connected by said write switch, said second memory is simultaneously connected by said read switch and thereafter when said second memory is connected by said write switch said first memory is simultaneously connected by said read switch.

9. A television receiver according to claim 7, in which said three-dimensional filter means includes an input delay line having a delay of ½ H and receiving said non-interlace video signal, a first adder for adding input and output signals of said input delay line and producing a sum signal, a subtracter for subtracting the output from the input signal of said input delay line and producing a difference signal therefrom, level adjuster means connected to said first adder and to said subtracter for adjusting the signal level of said sum and difference signals, respectively, low-pass filter means for filtering the level adjusted difference signal and low-passing a signal having high-frequency components removed therefrom, a compensation delay line for time compensating said level adjusted sum signal, and a second adder for adding output signals from said low-pass filter and from said compensation delay line.

10. A double-scanning television receiver supplied with an interlace video signal for converting said interlace video signal into a non-interlace video signal, comprising:

a sync-signal separating circuit receiving said interlace video signal and separating therefrom horizontal and vertical sync-signal;

a compensated delay line connected to an output of said television receiver for time delaying said interlace video signal;

a three-dimensional filter connected to the output of said television receiver for filtering vertical and horizontal high-frequency band frequencies occurring in said interlace video signal; and a double-scanning television display including a scan deflection circuit responsive to said horizontal and vertical sync-signals for displaying said time-delayed interlace video signal by a first scanning cathode and for displaying an output signal from said three-dimensional filter by a second scanning cathode, said first and second scanning cathodes being controlled by said deflection circuit.

11. A double-scanning television receiver, according to claim 10, in which said three-dimensional filter includes a delay line having a delay of one horizontal scan, a first adder for adding input and output signals of said delay line and producing a sum signal therefrom, a subtracter for subtracting the output of said delay line from the input thereof and producing a difference signal, level adjuster means connected to outputs of said first adder and said subtracter for adjusting the signal levels of said sum and differences signals, respectively, means for filtering the level adjusted difference signal and producing a signal having high-frequency components removed therefrom, a compensation delay line for time compensating said level adjusted sum signal, and a second adder for adding output signals from said low-pass filter and from said time compensation delay line.

* * * * *